UNITED STATES PATENT OFFICE.

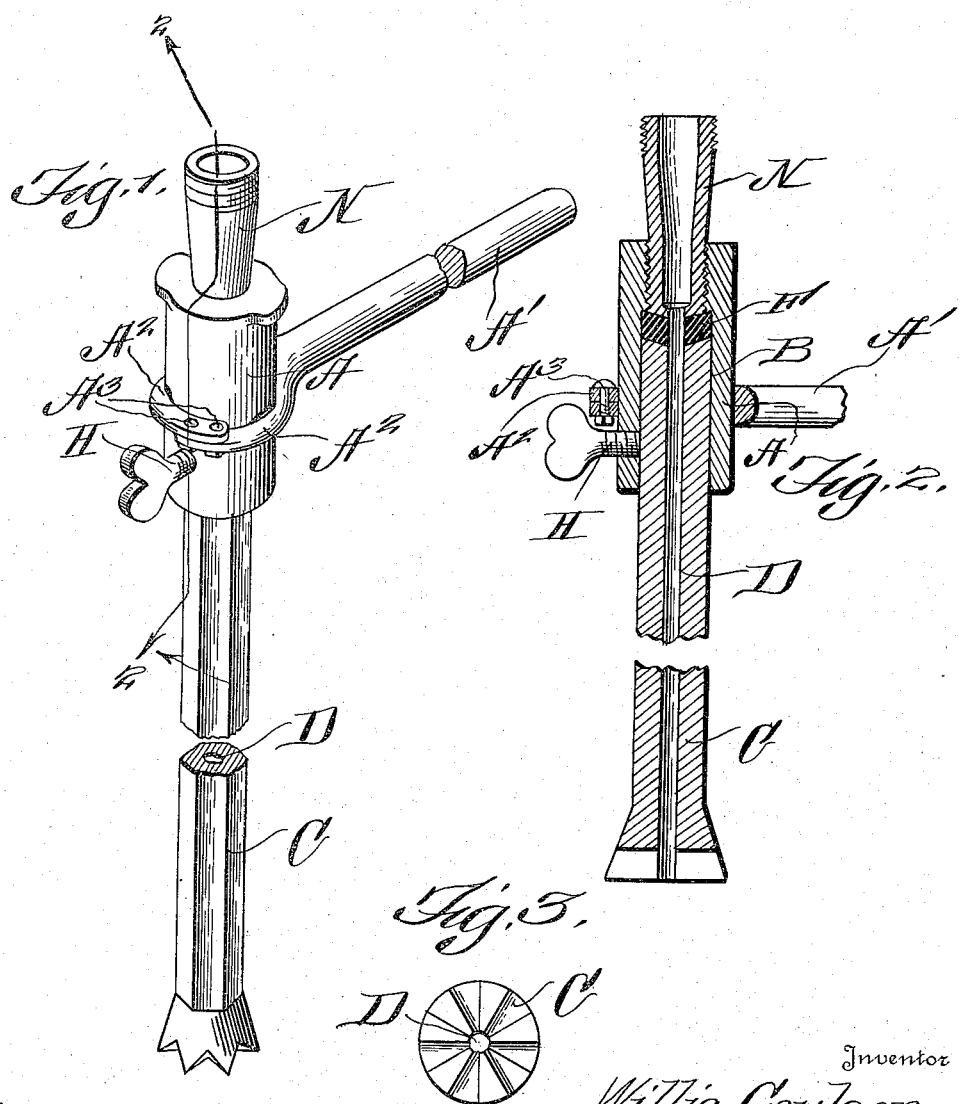

WILLIS COULSON, OF MACE, IDAHO.

CHUCK FOR DRILLS.

1,153,033.　　　Specification of Letters Patent.　　Patented Sept. 7, 1915.

Application filed June 1, 1915. Serial No. 31,466.

*To all whom it may concern:*

Be it known that I, WILLIS COULSON, a citizen of the United States, residing at Mace, in the county of Shoshone and State of Idaho, have invented certain new and useful Improvements in Chucks for Drills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in chucks for drills and the object in view is to produce a device of this nature so constructed that, in the event of the drill becoming set or stuck, air under pressure may be applied through the chuck and drill, forming means whereby the latter may be loosened.

My invention consists of a simple and efficient device of this nature, having various details of construction, combinations and arrangements of parts which will be hereinafter fully described, shown in the accompanying drawings and then specifically defined in the appended claim.

I illustrate my invention in the accompanying drawings, in which:—

Figure 1 is a perspective view. Fig. 2 is a sectional view on line 2—2 of Fig. 1, and Fig. 3 is an end view.

Reference now being had to the details of the drawings by letter, A designates a chuck which is chambered as at B with its inner surface preferably angular and adapted to conform to the angular circumference of the drill C, which latter is provided with a central longitudinal passageway D leading therethrough. Said chuck is held in place by means of a thumb screw H fitted in a threaded aperture in the latter and the upper end of the drill is inclined slightly, and a gasket F is placed within the chuck and bears against said inclined end. A spud N, tapering at one end and circumferentially threaded, engages threads within the chuck. The inner end of said spud is inclined and against which and a shoulder formed within the chuck said gasket is adapted to bear. The spud, which is hollow, communicates through an aperture in the gasket with the longitudinal passageway D. A flexible tube, not shown, is adapted to be attached to the outer circumference of the threaded portion of the spud whereby air may, under pressure, be communicated to the central longitudinal passageway of the drill. A handle A' has curved arms A² at one end which overlap and which arms surround the chuck and engage recesses formed in the circumference thereof, said arms being held in place by the bolts A³.

In operation, in the event of the drill being set in the hole, the chuck is connected to the end thereof with a spud in the chuck and air introduced through the longitudinal passageway, causing a pressure to be applied to the end of the drill which is set, thereby tending to loosen the same, allowing the drill to be readily removed.

What I claim to be new is;—

A chuck comprising a cylindrical shell with its socket angular to conform to the angular outlined circumference of a drill and interiorly threaded at one end to receive a pipe, the outside of said shell having indentures therein, a handle with forked ends engaging said indentures and their ends overlapping and secured together.

In testimony whereof I hereunto affix my signature in presence of two witnesses.

WILLIS COULSON.

Witnesses:
　THOMAS SHEEHAN,
　JAMES GARRETT.